July 21, 1970     T. J. HAGER ET AL     3,521,404
THRESHOLD CONSTRUCTION
Filed May 27, 1968
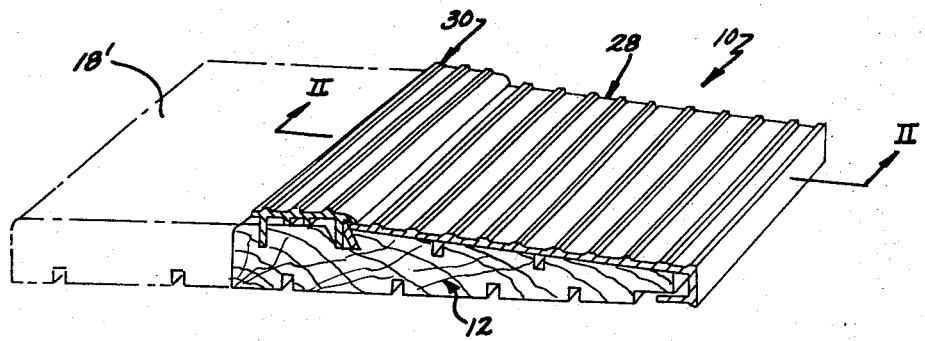
FIG. 1.
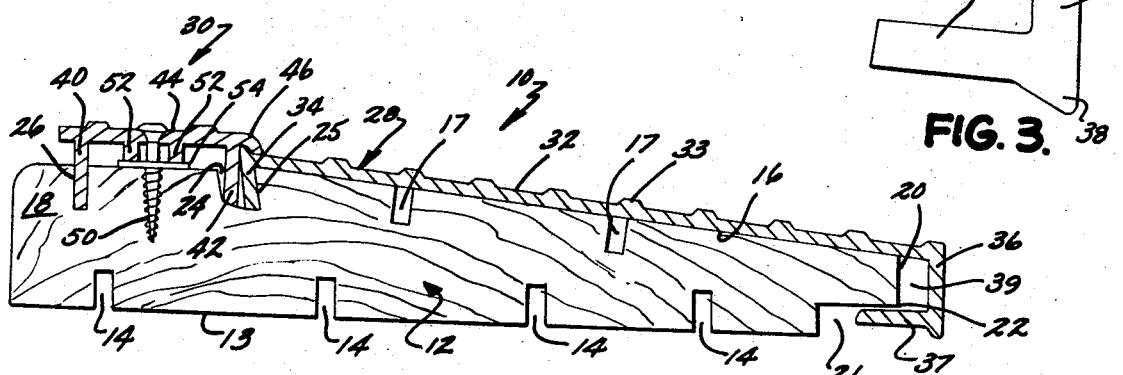
FIG. 2.
FIG. 3.
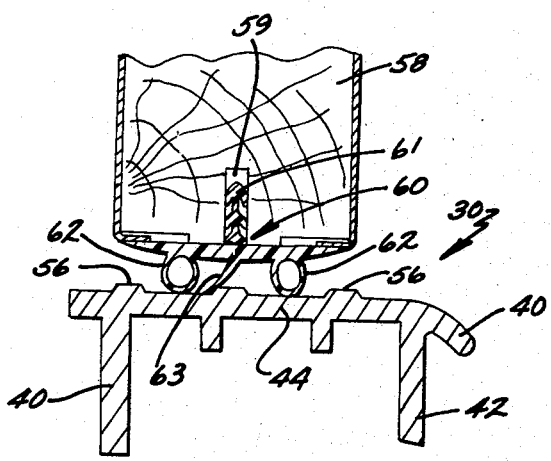
FIG. 5.
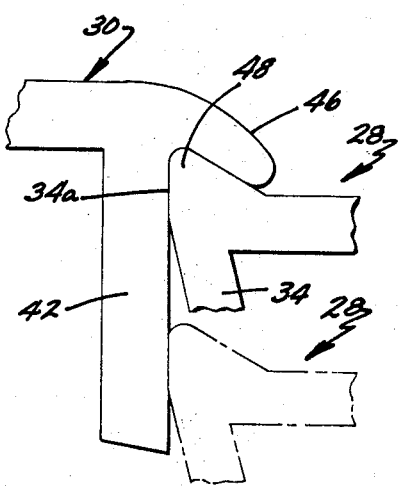
FIG. 4.
INVENTORS
TITUS J. HAGER
JOHN B. PAYNE SR.

United States Patent Office 3,521,404
Patented July 21, 1970

3,521,404
THRESHOLD CONSTRUCTION
Titus J. Hager and John B. Payne, Sr., Grand Rapids, Mich., assignors to Marquette Components Manufacturing Corporation, Grand Rapids, Mich., a corporation of Michigan
Filed May 27, 1968, Ser. No. 732,425
Int. Cl. E06b 1/70, 7/16
U.S. Cl. 49—468                              15 Claims

ABSTRACT OF THE DISCLOSURE

A threshold construction for doorways, of the type having a ramp-like tread portion and a threshold member which is vertically adjustable with respect thereto, wherein the tread portion comprises a metal sheathing member encasing the upper surface of a hardwood base, with the metal sheathing being attached to the base by a pair of spaced, downwardly depending flange extensions disposed at some acute angle with respect to each other to fit around an edge of the base and into an elongated groove therein, to thereby provide a clamping encirclement about the encased portions of the base. The adjustable threshold member has a pair of spaced, downwardly depending flanges, one of which is located within the same groove in the hardwood base as receives one of the tread member flanges; these two flanges are maintained in contact with each other at all adjusted positions of the threshold to provide a weatherproof seal; further, the threshold member provides an overhanging extremity which lies across the juncture of these two contacting flanges, to shelter and help seal this juncture from moisture and from the elements.

BACKGROUND

In relatively recent times, the conventional hardwood threshold long used in the building construction art has been greatly improved through the use of metal, typically by the provision of a metal covering or encasement, usually of extruded aluminum construction, together with a threshold piece of metal or other such material which is mounted for vertical adjustment with respect to the other portions of the threshold construction. This basic arrangement is a considerable improvement when compared to the conventional all-wood structure long used for the same purpose; however, this improved construction was itself the source of certain problems and difficulties, and it included several important limitations, including a fundamental problem of expense in manufacture and cost to the ultimate user, as well as a troublesome problem in properly weather-stripping the metal construction.

Because of these and other similar problems and limitations, numerous variations of the basic metal-and-wood threshold have been devised in an attempt to improve its weather-sealing capabilities and minimize the heat transfer through the metal elements, as well as to facilitate its manufacture and improve its overall design so as to lower the cost at which it may be sold and thereby overcome a seemingly inherent limited sales potential.

SUMMARY

The present invention provides a considerably simplified threshold construction of the wood-and-metal type, wherein a base component, preferably made of kiln-dried hardwood, is encased with an extruded aluminum sheathing to provide a tread portion, and a threshold member is mounted on the base immediately adjacent the edge of the tread portion in a manner permitting vertical adjustment of the threshold member with respect to the tread portion, to thereby accommodate the threshold to the particular door encountered.

The metal encasement for the tread portion slides into position upon the hardwood base and is self-retaining thereon, by means of flange-like attachment members effectively disposed at at least a slight acute angle with respect to each other. One of these flange-like members is L-shaped and extends around a rearward peripheral edge of the hardwood base, while the other fits into a groove formed in the base. This groove has a side surface which extends downwardly at an angle, toward the aforesaid peripheral edge, so that this edge and a side of this groove provide angularly-disposed surfaces which lie inside and are ensheathed by the aforesaid flange-like extremities of the metal tread portion. The threshold member is basically channel-shaped in cross section, having a pair of spaced, elongated legs or flanges by which it is mounted to the hardwood base. One such leg enters the aforementioned groove in the base which receives one of the flange-like extensions of the tread portion, and these two flange elements are positioned in contact with each other along a juncture line extending over their entire length. This juncture line is sheltered by an overhanging lip which extends cantilevered from the threshold member, such that the juncture line affords a weatherproof seal without the requirement of any sealing substances or members.

DRAWINGS

In the drawings:
FIG. 1 is a fragmentary, frontal perspective view of the present threshold construction, with a possible modification being shown in phantom;
FIG. 2 is an enlarged sectional elevational view taken through the vertical plane II—II of FIG. 1;
FIG. 3 is an enlarged, fragmentary side elevational of a portion of the structure seen in FIGS. 1 and 2;
FIG. 4 is an enlarged, fragmentary elevational view of another portion of the structure; and
FIG. 5 is an enlarged, fragmentary sectional elevation showing only the threshold member, in operative relationship with a door element.

PREFERRED EMBODIMENT

The threshold construction 10 of the invention, whose overall features are best seen in FIGS. 1 and 2, includes a solid base 12, which is preferably an integral piece of kiln-dried hardwood such as oak which has been thoroughly treated with a wood preservative of the penetrating type. The overall shape of this base member may be varied somewhat in accordance with particular applications, but generally it will have a basically flat, horizontal bottom surface 13 with a number of longitudinally-extending stress-relief channels 14 which may be saw kerfs. Also, the base has an upper surface which defines a rearwardly-inclining, ramp-like tread portion 16 that is oriented toward the outside of the doorway in which the threshold construction is installed. As illustrated, tread portion 16 also has stress-relieving saw kerfs or channels extending longitudinally across it, which are designated 17. At its forward edge extremity, the base 12 terminates in a nosing portion 18, which may be extended considerably forward or inwardly of the doorway (as shown in phantom at 18' in FIG. 1) in the case of outwardly-swinging doors. At its outward or rearward edge extremity, the base 12 defines a flat vertical edge extremity 20, at the bottom of which the base is horizontally undercut at 21 to provide an angular corner 22 which performs a hooking function, to be mentioned subsequently. At the forward edge of the tread portion 16, the base defines an elongated, flat-sided groove 24, the rearward side surface 25 of which is preferably oriented at an acute angle with respect to the vertical rearward edge 20 of the base. Spaced forwardly of groove 24 is a somewhat similar groove 26 which is, however, narrower in width and which has substantially vertical, close-together, parallel flat walls. Between grooves 24 and 26, the base has a flat and substantially horizontal upper surface.

Located atop the base 12 is a tread member 28 and a threshold member 30, each of which are preferably of metal and which may advantageously be formed of extruded aluminum. The tread member 28 forms a sheathing or encasement for the upper surface of the treaded portion 16, between the rearward edge 20 and the groove 24 thereof. Tread member 28 may generally be described as being channel-shaped in cross section, having a broad mid-portion or web 32 (which preferably has a series of longitudinally-extending ridges 33 on its upper surface for increasing the frictional contact presented to the foot) together with a pair of spaced, downwardly-depending leg or flange portions 34 and 36 extending along opposite sides of the web. It is to be noted that flange portion 34 at the forward edge of tread member 28 is disposed at the same acute angle with respect to the plane of web 32 as the rearward side 25 of the groove 24 into which this flange portion fits, whereas flange portion 36, at the rearward edge of the tread member is substantially vertical. Also, flange portion 36 has a right-angled foot extremity 37 (FIGS. 2 and 3) which forms an interior corner which fits around and beneath the angular corner 22 of the base, in a hooking relation. Finally, flange portion 36 has a downwardly-depending, generally V-shaped ridge-like protrusion 38 extending laterally along its lowermost extremity (FIG. 3). This protrusion extends downwardly somewhat below the foot extremity 37 to approximately the same level as the flat horizontal bottom 13 of the base 12, and forms a drip bead for the threshold construction. The angular relationship between the flange portions 34 and 36–37 of the tread member serve to partially encircle the respective edges of the base adjacent these flanges, such that the tread member may readily be slid sideways into place upon the base but once in place will be securely and firmly retained thereupon against vertical disengagement without the requirement of additional fastening members such as screws or the like.

It is to be noted that the downwardly-depending flange or leg 36 of the tread member 28 does not abut against the rearward edge 20 of the base 12, and instead is spaced from the latter to provide an air space 39 therebetween. Also, the foot portion 37 of flange 36 does not fully close the horizontal undercut 21 in the bottom of the base to maintain an air space both forwardly of and above foot 37, which space communicates with the aforementioned air space 39. These air spaces provide a very desirable area for accommodating expansion of the base 12 where the latter is of the preferred wood construction, inasmuch as at least some such expansion will almost inevitably take place, regardless of the amount of preservative with which the base is treated. The oppositely-disposed sets of stress-relief channels 14 and 17 are also important for connection with such expansion, since they will compensate for it by maintaining the base time and unwarped in the presence of usual amounts of ambient moisture.

The threshold member 30 is also generally channel-shaped in cross section, having a pair of downwardly-depending legs 40 and 42 and a web or interconnecting bridge portion 44 extending across the top of these legs. The groove 26 in base 12 which receives leg 40 of the threshold member is only slightly wider than this leg itself, so that the fit between leg 40 and groove 26 is a close, smoothly-slideable one. This interfitting relationship serves to position the threshold member 30 and places its other leg or flange element 42 in firm contact with the forward flange portion 34 of the tread member, which has a flattened vertical extremity 34a (FIG. 4) near its top for flush contact with the generally vertical side of the threshold member leg 42. This essentially vertical juncture between the two flange-like portions 42 and 34 should remain a line of mutual contact regardless of vertical movement of the threshold member with respect to the tread member, to provide a flush, metal-to-metal seal between these members.

The line of flush, abutting contact between the leg or flange portion 42 of threshold 30 and the flattened vertical extremity 34a of the tread member flange element 34 is shielded from overhead by the presence of a protruding lip 46 (FIGS. 2 and 4) extending in cantilevered fashion outwardly from the tread member 30 and overhanging the slideable juncture or joint between the threshold and tread members. As illustrated, the overhanging lip 46 is preferably an integral part of the threshold member, and extends laterally therefrom immediately adjacent the downwardly depending flange portion 42 thereof. It is to be noted that lip 46 is oriented at a slight downward angle with respect to the top portion 44 of the threshold member, and extends at a modest angle toward the top 32 of the tread member. Further, the upper front corner of the tread member (immediately above the downwadly depending forward flange element 34 thereof) is preferably formed to have an upwardly-oriented note portion 48 (FIG. 4), which is shaped to fit smoothly into the generally V-shaped notch defined between the overhanging lip 46 of the tread member and the downwardly depending flange portion 42 thereof, as illustrated. As will be appreciated, the overhanging lip 46 will shield and protect the sliding metal-to-metal juncture of the tread member and threshold member, both from elemental precipitation and from dirt, snow, moisture, and the like carried on the shoes of persons passing over the threshold construction, such that these foreign substances will not normally have ready access to the sliding juncture between the tread member and threshold member; further, the flush abutment between these two members at any of the vertically adjustable positions of the threshold will very adequately seal off any minor quantities of such substances as may somehow find their way to the upper extremity of this juncture despite the shelter afforded by lip 46.

The threshold member 30 is secured to the base 12 by a plurality of spaced screws such as are seen at 50 (FIG. 2), which extend through appropriate apertures in the interconnecting web portion 44 of the threshold and pass downwardly into the base itself. As illustrated, the threshold member 30 has a secondary pair of longitudinally-extending, downwardly-depending legs or flanges 52 which are located generally centrally of the web 44, between the longer primary legs or flange portions 40 and 42 discussed above. The screws 50 extend downwardly between these secondary legs or flanges 52, and a desired number of washer-like shims 54 may be located beneath secondary legs 52, between the bottom edges thereof and the top of the base 12, to position the threshold member 30 at a desired height with respect to the tread member and the remainder of the threshold construction generally. In this manner, the threshold member may be raised and adjusted in almost any manner desired, regardless of whether one end must be higher than the other, or even though the threshold must be arched or bowed somewhat upwardly or downwardly over its length in order to closely conform to the door swinging directly thereover.

A futher feature of the present threshold construction lies in the presence of a series of spaced ridges 56 (FIG. 5) located on the upper surface of the interconnecting web portion 44 of the threshold member 30. As illustrated, these ridges are generally similar in appearance and nature to the ridges 33 on the tread member 28, but in the case of the threshold member they serve an added purpose. Specifically, the present threshold construction is most advantageously used in connection with a door 58 having a weather-stripping arrangement along its bottom edge which comprises an elongated strip 60 of extruded vinyl or the like. This strip has an upstanding central leg 61 which fits into a vertical slot 59 in the bottom of door 58, with a series of small, laterally-angled tooth-like flanges for gripping the sides of slot 59 for more secure retention. Also, strip 60 has a pair of elongated tubular potrions 62 depending downwardly from its bottom surface, and a tongue-like sweep element 63 located between such tubular portions and extending parallel to and coextensive with the same. The tubular portions 62 and the sweep element 63 sweep across the top of the threshold member when the door is opened or closed, and the vertical extent of each should exceed the distance between the bottom of the strip 60 and the top of the threshold element, such that the tubular portions 62 are slightly compressed against the top of the threshold and indexed between the spaced ridges 56, while the sweep element 63, which is somewhat longer, will resiliently buckle or bend in the manner illustrated as it is moved by the door across the threshold member, and this element preferably indexes against the central threshold ridge 56. As will be apparent, this arrangement very effectively weather-strips the door bottom sealing out the cold and dampness from the interior of the building on which the threshold construction is used.

By means of its unique structural arrangement, the present threshold construction avoids and makes unnecessary many structural complexities of previous thresholds of a generally similar nature, while at the same time providing excellent functional characteristics and considerably simplified and less expensive manufacturing requirements. It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended heebelow, unless these claims by their language specifically state otherwise.

The embodiments of the invention in which an exclusive property or privilege is claimed are defined as follows:

1. A threshold construction for doorways, comprising in combination: means forming a tread member, having a tread surface for location adjacent to and outwardly of the bottom edge of a door mounted in such doorway; a rigid threshold member; means for mounting said threshold member immediately beneath such door and generally inwardly of said tread surface, and means for shifting vertically in a single direction at one time the entire threshold member with respect to the tread member; said threshold member having portions overhanging at least part of said tread surface, for shielding such part of said surface from moisture and the like.

2. The threshold construction of claim 1, wherein said tread member and said threshold member each have a generally vertically disposed side surface located closely adjacent one another, and wherein said overhanging portions of said threshold member extend over both of said adjacent side surfaces.

3. The threshold construction of claim 2, wherein said overhanging portions define a cantilevered lip having an edge extremity which depends downwardly from said threshold member at least slightly, toward the top of said tread surface.

4. The threshold construction of claim 3, wherein said side surfaces of said tread member and threshold member are in contact with each other at least certain of the vertically adjustable positions of said threshold member.

5. A threshold construction for doorways, comprising in combination: a base means having an upper surface and defining generally vertical first and second edges, said edges being spaced apart and extending downwardly from said upper surface; a first one of said edges oriented at least a slightly acute angle with respect to said upper surface and extending toward the other such edge at least slightly; a tread member comprising an outer sheathing for the upper surface portions of said base means located between said first and second edges; said tread member having a first and a second downwardly-depending flange element spaced apart substantially the same distance as said first and second edges of said base and arranged at the same general relative angular relationship, to fit around such edges in adjacent flanking relationship; said angular relationship of said edges and flanges forming a retaining encirclement for said tread member operating to hold the same in place upon said base means.

6. The threshold construction of claim 5, further including a threshold member mounted on said base means for vertical adjustment with respect to said tread member, said threshold member having a generally vertical flange portion which lies in contact with one of said tread member flange elements at certain of the adjusted positions of the threshold member.

7. The threshold construction of claim 6, wherein said base means comprises a slab of solid material having an elongated groove across its upper surface, one side of said groove forming said first edge, and said groove receiving said threshold member flange portion and the said tread member flange element with which such flange portion makes contact.

8. The threshold construction of claim 7, wherein said slab has a second elongated groove formed in its upper surface spaced from and parallel to the first such groove, said second groove having parallel and flat side surfaces, and said threshold member having a second flange portion positioned such that it fits into said second elongated groove, said second flange portion having generally parallel and flat sides and a thickness such that its sides closely fit between said sides of said second elongated groove for smooth vertical sliding contact with at least one thereof, such that said threshold member is guided and positioned at different positions of vertical adjustment by said closely interfitting groove and flange portion.

9. A threshold construction for doorways, comprising in combination: a base means having an upper surface and defining generally vertical first and second edges, said edges being spaced apart and extending downwardly from said upper surface; a tread member comprising an outer sheathing for the upper surface portions of said base means located between said first and second edges; said tread member having a first and a second downwardly-depending flange element spaced apart substantially the same distance as said first and second edges of said base and arranged to fit around such edges in adjacent flanking relationship; a threshold member mounted on said base means for vertical adjustment with respect to said tread member, said threshold member having a generally vertical flange portion which lies in contact with one of said tread member flange elements at certain of the adjusted positions of the threshold member; and said threshold member defining a projecting lip portion which overhangs the area of contact of said contacting threshold member flange portion and tread member flange element to shield the same from moisture and the like.

10. The threshold construction of claim 9, wherein said base means comprises a slab of solid material having an elongated groove across its upper surface, one side of said groove forming said first edge, and said groove receiving said threshold member flange portion and the said tread member flange element with which such flange portion makes contact.

11. The threshold construction of claim 10, wherein said base comprises a wooden block having longitudinally-extending recesses formed in both its top and bottom surfaces for stress relief.

12. The threshold construction of claim 10, wherein said slab has a second elongated groove formed in its upper surface spaced from and parallel to the first such groove, said second groove having parallel and flat side surfaces, and said threshold member having a second flange portion positioned such that it fits into said second elongated groove, said second flange portion having generally parallel and flat sides and a thickness such that its sides closely fit between said sides of said second elongated groove for smooth vertical sliding contact with at least one thereof, such that said threshold member is guided and positioned at different positions of vertical adjustment by said closely interfitting groove and flange portion.

13. The threshold construction of claim 12, wherein said slab has an outer peripheral extremity forming the other of its said second edge, said slab being undercut at least slightly at the bottom of said peripheral extremity to form an angular hooking corner, said tread member having a generally L-shaped peripheral edge forming the other of said tread member flange elements, said L-shaped peripheral edge fitting around said angular hooking corner to augment retention of said tread member upon said slab.

14. The threshold construction of claim 13, wherein said L-shaped peripheral edge of said tread member is spaced from said second edge and said undercut of said slab to provide an air space therebetween.

15. The threshold construction of claim 13, wherein said L-shaped peripheral edge further defines an elongated downwardly-oriented generally V-shaped protrusion along its lower corner, said protrusion forming a drip bead inhibiting the passage of moisture beneath said slab.

References Cited

UNITED STATES PATENTS

| | | | |
|---|---|---|---|
| 784,904 | 3/1905 | Stevenson | 49—484 |
| 2,805,741 | 9/1957 | Evans et al. | 49—484 X |
| 3,273,287 | 9/1966 | Pease | 49—468 |
| 3,310,920 | 3/1967 | Bell et al. | 49—467 |
| 3,382,617 | 5/1968 | St. Aubin | 49—468 |

J. KARL BELL, Primary Examiner

U.S. Cl. X.R.

49—469, 484, 488, 489